(12) United States Patent
Wierzoch et al.

(10) Patent No.: US 8,704,944 B1
(45) Date of Patent: Apr. 22, 2014

(54) HANDHELD MODULAR DIGITAL PHOTOGRAPHY SYSTEM

(75) Inventors: Markus Wierzoch, Seattle, WA (US); Olen Ronning, Seattle, WA (US); Robert "Rob" Girling, Woodinville, WA (US); Fernd Van Engelen, Bothell, WA (US)

(73) Assignee: Girling Kelly Design Group, LLC, Seattle, WA (US)

( * ) Notice: Subject to any disclaimer, the term of this patent is extended or adjusted under 35 U.S.C. 154(b) by 175 days.

(21) Appl. No.: 13/405,217

(22) Filed: Feb. 24, 2012

Related U.S. Application Data (60) Provisional application No. 61/446,583, filed on Feb. 25, 2011.

(51) Int. Cl.
*H04N 5/225* (2006.01)
(52) U.S. Cl.
USPC .................................. 348/375; 348/207.99
(58) Field of Classification Search
CPC ... H04N 5/251; H04N 5/2252; H04N 5/2253; H04N 5/2254; H04N 5/2257
USPC .................... 348/373, 374, 375, 376, 207.99
See application file for complete search history.

(56) References Cited

U.S. PATENT DOCUMENTS

| | | | | |
|---|---|---|---|---|
| 5,221,964 | A * | 6/1993 | Chamberlain et al. | 348/373 |
| 6,256,063 | B1 * | 7/2001 | Saito et al. | 348/231.99 |
| 7,042,495 | B2 * | 5/2006 | Nakamura | 348/207.1 |
| 8,274,601 | B2 * | 9/2012 | Hsieh et al. | 348/375 |

\* cited by examiner

*Primary Examiner* — Tuan Ho
(74) *Attorney, Agent, or Firm* — Patrick J. S. Inouye; Leonid Kisseley

(57) ABSTRACT

A handheld modular digital photography system is provided. A lens assembly includes a plurality of lens elements aligned on an optical axis to form an optical image on a plane of a digital image sensor. Both the lens elements and image sensor are fixedly mounted within a lens barrel. The image sensor is electrically-interfaced to a controller with a wireless transceiver. A modular chassis includes a structural frame, lens mount, and shutter control. The structural frame includes a cradle shaped to securely hold a handheld mobile device and an electrical coupler configured to electronically interface with the mobile device. The lens mount is on an outer surface of the modular chassis. The shutter control is provided to electrically signal the mobile device. The mobile device wirelessly sends the signal to the controller, which triggers image capture by the image sensor and wireless relay of the captured image to the mobile device.

21 Claims, 5 Drawing Sheets

HANDHELD MODULAR DIGITAL PHOTOGRAPHY SYSTEM

CROSS-REFERENCE TO RELATED APPLICATION

This non-provisional patent application claims priority under 35 U.S.C. §119(e) to U.S. Provisional Patent Application Ser. No. 61/446,583, filed Feb. 25, 2011, the disclosure of which is incorporated by reference.

FIELD

The present invention relates in general to digital photography and, in particular, to a handheld modular digital photography system.

BACKGROUND

Digital cameras have been commercially available since the mid-1990s. Early digital cameras were a far cry from their film-based contemporaries in terms of features and convenience of use. First generation digital cameras typically had limited pixel resolutions, short battery life, and modest digital photograph storage capabilities. Moreover, software to upload and view digital photographs was frequently wrought with incompatibilities in then-available operating systems and computer hardware, increasing user frustration, while printing digital photographs on photographic-grade media was largely inaccessible to the average consumer due to a scarcity of laboratories equipped to handle digital images.

Since then, the field of digital photography has rapidly matured, with digital photography first supplementing and then displacing traditional film photography. Currently, virtually all major camera manufacturers offer digital cameras, and the various offerings of digital cameras range from consumer entry-level "point-and-shoot" cameras with an all-in-one form of construction to professional-grade digital single lens reflex (DSLR) cameras that feature reflex mirror or equivalent systems, interchangeable lenses and numerous accessories, with many classes of digital cameras falling in-between those extremes. As well, many current digital cameras include a capability to capture video in addition to taking still photographs, and digital image and video processing software are now generally included as an integral part of every personal computer. Moreover, the printing of digital photographs is widely available through do-it-yourself inkjet and laser printers and from commercial digital printing presses operated by commercial and "picture-in-a-minute" printing laboratories alike.

The appeal of digital photography has led to the integration of digital photographic capabilities into devices outside the dominion of traditional cameras, in part due to the ready viewability of digital photographs on digital screens and the inherent exchangeability of digital photographs online. In particular, smart phones and similar types of handheld mobile devices regularly include digital cameras for taking digital photographs and recording video. Mobile devices generally provide touch screen user interfaces, a computing ability for downloading and running a wide range of applications, and high-speed data access via wireless technology, including Wi-Fi, Bluetooth and mobile broadband. As a result, digital images and video can be easily captured, viewed, manipulated, edited, and posted online using just a single mobile device.

Notwithstanding, built-in digital cameras are a compromise. The primary function of a mobile device is not to be a substitute for a full-featured digital camera. Rather, digital photographic capabilities are provided as a set of convenient onboard features, and the digital camera components compete with other onboard components for computing cycles, memory and persistent storage space, power, and physical space. For instance, the digital image sensor, which defines the pixel resolution, is limited in size, as larger image sensors will not physically fit inside a typical mobile device. Moreover, storing high resolution digital images would consume scarce memory and storage to the exclusion of other applications. Similarly, the lens is invariably limited to an extremely short focal length due to the physical constraints of the mobile device's case.

Therefore, a need remains for a photographic system that combines the features of a mobile device with digital photography capabilities more akin to those features found on dedicated digital cameras.

SUMMARY

Digital images can be captured by combining a self-contained digital lens assembly with a mobile device, such as a smartphone, using a modular chassis. The modular chassis includes a structural frame to securely hold the mobile device and a lens mount to allow physical attachment of the digital lens assembly. The mobile device controls the digital lens assembly through a wireless interface. The mobile device includes a user interface, which includes a visual display and input controls. The mobile device executes a shutter control application that remotely triggers the image sensor to capture an image in response to the pressing of an electrically-interfaced shutter control provided on the modular chassis. The digital lens assembly wirelessly relays the captured digital image back to the mobile device, which then displays the captured digital image on the visual display by executing a display application.

One embodiment provides handheld modular photography system. A lens assembly that includes a plurality of lens elements is aligned on an optical axis to form an optical image on a plane of a digital image sensor. Both the lens elements and image sensor are fixedly mounted within a lens barrel. The image sensor is electrically-interfaced to a controller with a wireless transceiver. The lens barrel is provided with a mechanical lens coupling on an outer proximal end. A modular chassis includes a structural frame, lens mount, and shutter control. The structural frame includes a cradle shaped to securely hold a handheld mobile device and an electrical coupler provided on an interior surface of the cradle into which the mobile device can be electronically interfaced. The lens mount is on an outer surface of the modular chassis opposite the cradle disposed to receive and securely couple the lens coupling. The shutter control is provided on the structural frame and configured to electrically signal the mobile device via the electrical coupler. The mobile device wirelessly sends the signal to the controller through the wireless transceiver, which triggers capture of the optical image by the image sensor and wireless relay of the captured image through the wireless transceiver back to the mobile device.

A further embodiment provides a handheld modular photography system. An interchangeable lens includes a plurality of lens elements aligned on a common optical axis. The lens elements are fixedly mounted within a lens barrel. The lens barrel is provided with a lens coupling about an outer proximal end. A lens adapter includes a digital image sensor electrically-interfaced to a controller with a wireless transceiver. An adapter housing defines a circular bore with the image sensor fixedly mounted at on the bottom surface of the circular bore. The adapter housing further includes a lens mount on an outer distal end and an adapter coupling on an outer proximal end. The lens mount is disposed to receive and securely couple the lens coupling and maintain the common optical axis to form an optical image on a plane of the image sensor. A modular chassis includes a structural frame, which includes a cradle shaped to securely hold a handheld mobile device and an electrical coupler provided on an interior surface of the cradle into which the mobile device can be electronically interfaced. The modular chassis further includes an adapter mount on an outer surface of the modular chassis opposite the cradle disposed to receive and securely couple the adapter coupling. Finally, the modular chassis includes a shutter control provided on the structural frame and configured to electrically signal the mobile device via the electrical coupler. The mobile device wirelessly sends the signal to the controller through the wireless transceiver, which triggers capture of the optical image by the image sensor and wireless relay of the captured image through the wireless transceiver back to the mobile device.

A still further embodiment provides a handheld modular photography system. A lens assembly includes a plurality of lens elements aligned on an optical axis to form an optical image on a plane of a digital image sensor. Both the lens elements and image sensor are fixedly mounted within a lens barrel. The image sensor is electrically-interfaced to a controller with a wireless transceiver. The lens barrel is provided with a mechanical lens coupling on an outer proximal end. A modular chassis includes a structural frame, which includes a cradle shaped to securely hold a handheld mobile device equipped with a visual display and an electrical coupler provided on an interior surface of the cradle into which the mobile device can be electronically interfaced. The modular chassis further includes a lens mount on an outer surface of the modular chassis opposite the cradle disposed to receive and securely couple the lens coupling. The modular chassis further includes a shutter control provided on the structural frame and configured to electrically signal the mobile device via the electrical coupler. The mobile device wirelessly sends the signal to the controller through the wireless transceiver, which triggers capture of the optical image by the image sensor and wireless relay of the captured image through the wireless transceiver back to the mobile device. Software modules are electronically stored in a computer-readable storage in the mobile device as code configured to be executed by a processor of the mobile device. A shutter control module is configured to cause the mobile device to wirelessly command the digital image sensor of the digital lens assembly to capture the image formed on the image sensor's plane and wirelessly send that captured image back to the mobile device. A display module is configured to cause the mobile device to present the captured image on the display upon receipt from the wireless transceiver.

The purely mechanical coupling of the lens assembly to the modular chassis removes conventional limitations on manufacturer-specific lens mounts, as lens assemblies need only physically fit into the lens mount to work. Moreover, lens-specific electro-mechanical operations, which are remotely controlled through an integral controller equipped with a wireless interface within each lens assembly, can be performed in a vendor-independent manner by loading the appropriate software applications on to the mobile device held within the modular chassis.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

The versatility of a mobile device, such as a smart phone, can be combined with a self-contained wireless digital lens assembly to provide a digital photographic system with capabilities on par with full-featured digital cameras.

Figure 1A:
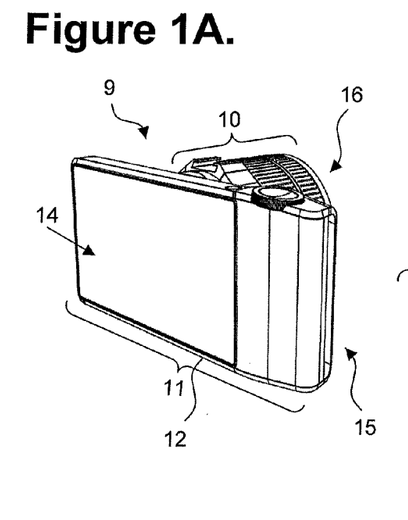
FIGS. 1A and 1B are respectively rear and front perspective views showing a handheld modular digital photography system in accordance with one embodiment.
Figure 1B:
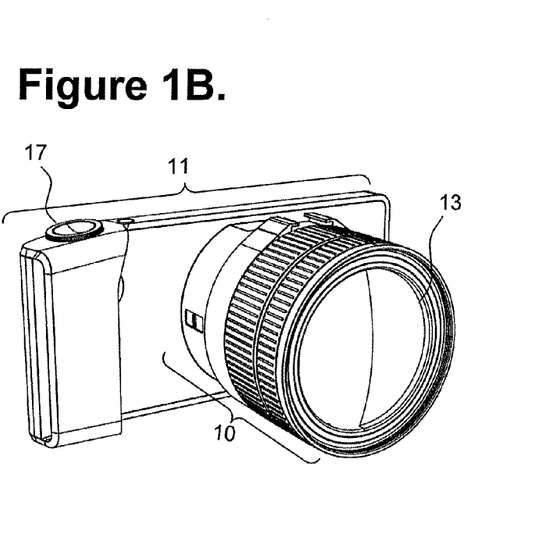

FIGS. 1A and 1B are respectively rear and front perspective views showing a handheld modular digital photography system 9 in accordance with one embodiment. The system 9 includes a modular chassis 15 upon which is securely mounted a removable self-contained wireless digital lens assembly 16. The modular chassis 15 includes a structural frame 11 within which a handheld mobile device 12, such as a smart phone, personal data assistant, tablet computer, and the like, is securely held. The modular chassis 15 is further described below with reference to FIGS. 3A and 3B.

The digital lens assembly 16 is a self-contained remotely-controllable digital camera component that includes a plurality of lens elements 13 aligned on an optical axis to form an optical image on the plane of a digital image sensor (not shown). The lens elements 13 and image sensor are fixedly mounted within a lens barrel 10. The image sensor is electrically interfaced to a microprocessor-managed controller that includes a wireless interface. The digital lens assembly 16 is described in further detail below with reference to FIGS. 4A and 4B.

The digital lens assembly 16 is wirelessly interconnected through the onboard wireless interface with the mobile device 12. The mobile device 12 includes a user interface implemented through a touch-sensitive visual display 14. The mobile device's user interface allows a user to both wirelessly control the operation of the digital lens assembly 16 and observe images provided through the image sensor as a form of remote viewfinder. In addition, the modular chassis 15 includes a shutter control 17 provided on the structural frame 11 that is electrically interfaced to the mobile device 12 using an electronic coupler that connects directly into the mobile device 12. Operationally, upon actuation of the shutter control 17, the mobile device 12 wirelessly sends a signal to the digital lens assembly 16, which captures a digital image that is then wirelessly relayed back to the mobile device 12. Software applications, as further described below with reference to FIGS. 5A through 5E, are executed by the mobile device 12 to enable the user to control the digital lens assembly 16, including control the digital lens assembly 16 by adjusting the shooting parameters of the digital lens assembly 16, setting the values of photographic variables of the image to be captured by the image sensor, and so forth, as well as viewing, manipulating, editing, posting online, storing, sending, and performing other operations on captured digital images.

Figure 2:
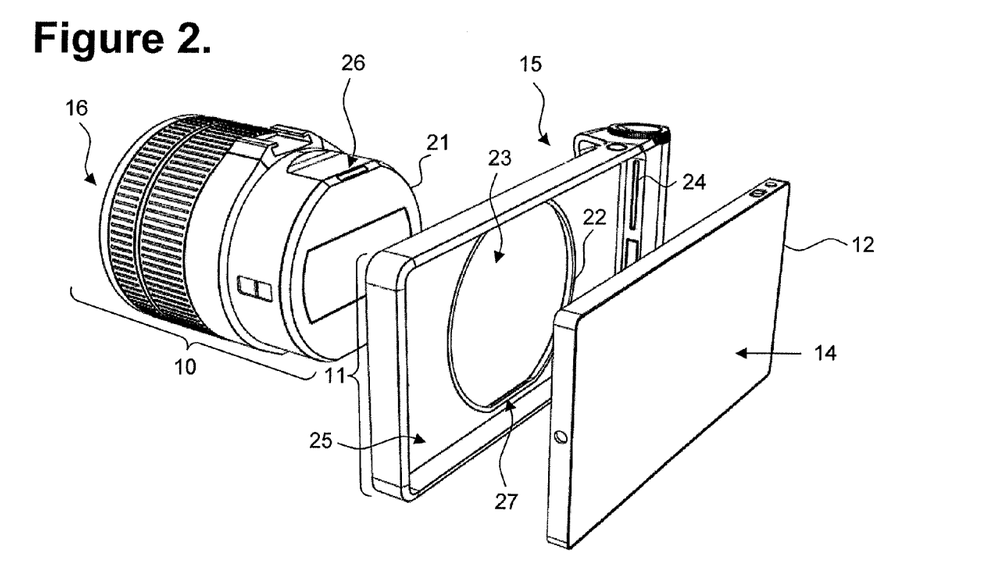
FIG. 2 is an exploded view showing the handheld modular digital photography system of FIGS. 1A and 1B in side perspective.

The lens assembly 16 is mechanically coupled to the modular chassis 15, while the mobile device 12 is both mechanically and electrically coupled. FIG. 2 is an exploded view showing the handheld modular digital photography system 9 of FIGS. 1A and 1B in side perspective. The structural frame 11 includes a cradle 25 that is shaped to securely hold the mobile device 12. The cradle 25 can be conformably shaped to match the outer contours of the mobile device 12 to frictionally grip and secure the device within. The structural frame 11 also includes an electrical coupler 24 that is provided on an interior surface of the cradle 25 into which the mobile device's data interface port (not shown) can be plugged. Conventional data interface ports include both proprietary, vendor-specific interfaces, such as provided on the iPhone, sold by Apple Inc. of Cupertino, Calif., and open standard interfaces, such as Universal Serial Bus (USB) interfaces.

The digital lens assembly 16 is received and securely coupled to the modular chassis 15 through a purely mechanical connection that serves to combine the digital lens assembly 16 and the modular chassis 15 into a unitary assembly. All other interfacing with the digital lens assembly 16, whether to effect an electronic and mechanical change, is accomplished remotely through the wireless interfaces of the digital lens assembly and the mobile device 12. Additionally, the digital lens assembly 16 could be operated entirely detached from the modular chassis 15, although in a non-handheld configuration.

The digital lens assembly 16 includes an integral mechanical lens coupling 21 on the outer proximal end of the lens barrel 10. The lens coupling 21 is contoured to mate with a corresponding lens mount 22 provided on an outer surface of the structural frame 11 on the side opposite the cradle 25. The lens mount 22 can be structurally defined as a semi-circular cavity 23 formed on the bottom surface of the cradle 25. Other shapes of lens mounts are possible, so long as the lens coupling and lens mount provide mutually compatible assemblies that allow secure coupling of the lens barrel 10 to the structural frame 11. In addition, the lens mount 16 could be absent entirely, and the structural frame 11 could instead mechanically fasten the lens barrel 10 solely through the latching of a catch or similar fastener onto the lens barrel 10. The lens coupling 21 also includes a sprung latch or tongue 26 that extends into a receiving groove 27 defined along the circumference of the lens mount 22 to securely hold the lens barrel 10 in place when the lens coupling 21 is received into the lens mount 22. Other forms of fasteners are also possible, including a screw-type mount that employs helical threads on the respective outer and inner surfaces of the lens coupling and lens mount or a bayonet mount that uses a mechanical pairing of slots and pins.

In a further embodiment, the digital lens assembly 16 is constructed as a lens adapter to enable the use of third-party interchangeable lenses. Major camera manufacturers, such as Nikon Corporation of Tokyo, Japan; Canon Inc. of Tokyo Japan; and Leica Camera AG of Solms, Germany, offer a broad range of interchangeable lenses of various types, including prime wide angle, normal, and telephoto lenses, zoom lenses, and special purpose lenses, such as used in macro photography. Typically, the lenses offered by the major camera manufacturers are provided with a proprietary lens mounting configuration. Other lens manufacturers are often able to supplement the lenses offered by a specific camera manufacturer by providing their lenses with a compatible lens coupling that fits into the lens mounts on the camera bodies sold by that camera manufacturer. Camera enthusiasts often build up a collection of lenses for a specific kind of lens mount and are reluctant to buy new lenses whenever a new camera body with a different type of lens mount becomes available. Fortunately, lens adapters, which adapt the lens mounting configuration of one manufacturer to fit the lens mounting configuration of another manufacturer, enable the use of otherwise incompatible lenses with a particular camera body.

Here, a lens adapter is provided by substituting the plurality of lens elements and associated hardware with a third-party compatible lens mount on a distal end of an adapter housing. When a third party lens is fitted to the lens adapter, light passes through the third party lens' lens elements and the lens adapter proper to form an optical image on the plane of a digital image sensor. Like the digital lens assembly 16, the lens adapter still includes an image sensor that is electrically interfaced to a microprocessor-managed controller that includes a wireless interface. However, the lens adapter omits the plurality of lens elements and any associated electromechanical components required to remotely operate those lens elements, although adapter-specific lens elements may be necessary for some types of lenses to properly accommodate those lenses to the increased optical path occasioned by the extended focal length created by the width of the lens adapter. The lens adapter also includes an adapter coupling 21 contoured to mate with a corresponding adapter mount 22 provided on an outer surface of the structural frame 11 on the side opposite the cradle 25.

Figure 3A:
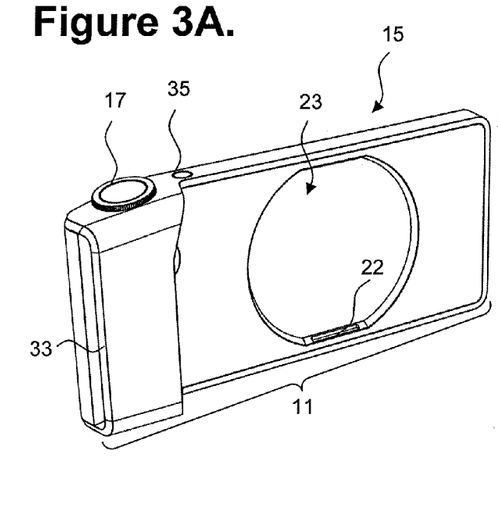
FIGS. 3A and 3B are respectively front and rear perspective views showing the modular chassis of FIGS. 1A and 1B.
Figure 3B:
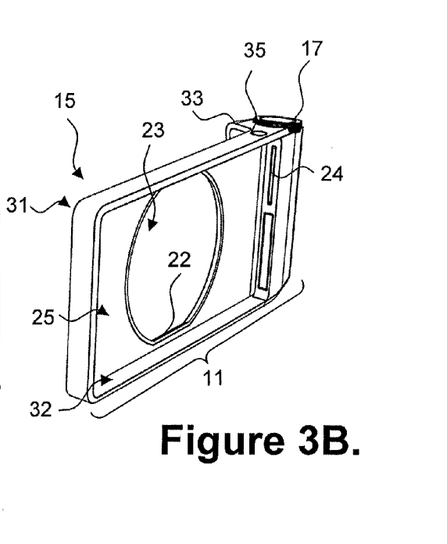

The modular chassis 15 respectively combines the digital lens assembly and the mobile device into a single unit through a combination of mechanical and electro-mechanical coupling. The modular chassis 15 also provides additional features to facilitate control over photographic operations and general usability. FIGS. 3A and 3B are respectively front and rear perspective views showing the modular chassis 15 of FIGS. 1A and 1B. The modular chassis 15 includes a structural frame 11 manufactured from a suitably rigid material, such as steel, aluminum, magnesium alloy, polycarbonate plastic, and the like. The outer surfaces 31 of the modular chassis 13 can be rubberized to aid grip. Similarly, rubber or other types of elastomeric materials can be applied to the inner margins 32 of the cradle 25 to help securely grip the outer contours of the mobile device 12.

An ergonomic grip 33 is formed on the left side (viewed from the front lens-mounting surface) upon which the shutter control 17 is mounted for convenient finger-actuateable operation, although the shutter control could alternatively be placed elsewhere on the modular chassis 15. Additional controls 35 could also be provided on the modular chassis 15, including controls for manual or autofocus, zoom, shutter speed, aperture, power, and other settings and operational modes. Both the shutter control 17 and any additional controls 34 do not directly connect to the digital lens assembly 16, but rather remotely interface via the wireless capabilities of the mobile device 12, which wirelessly relays commands to the wireless interface and controller of the digital lens assembly 16.

The ergonomic grip 33 also provides a housing for the electronic components required to interface with the electronic coupler that connects directly into the mobile device 12. In addition, an auxiliary battery (not shown) can be housed in the ergonomic grip 33 to recharge or supplement the mobile device's built-in battery, as well as a removable memory interface, such as an SD Card reader, to store optical images captured by the image sensor of the digital lens assembly 16 or as supplemental non-volatile storage for the mobile device 11. The auxiliary battery can optionally be rechargeable, either through recharging circuitry provided in the ergonomic grip or as a removable battery.

The digital lens assembly 16 is a self-contained, self-powered lens and digital imaging component. Different types of digital lens assemblies 16 could be manufactured in various focal lengths and as prime, zoom or special purpose lenses in a manner similar to conventional interchangeable camera lens, but with the addition of a digital image sensor, controller, and wireless transceiver.

Figure 4A:
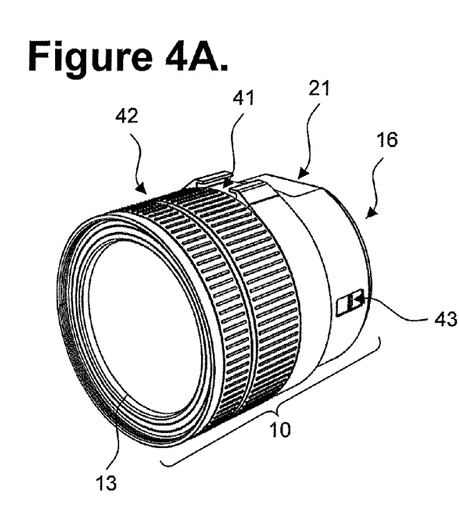
FIGS. 4A and 4B are respectively front and side perspective views showing the digital lens assembly of FIGS. 1A and 1B.
Figure 4B:
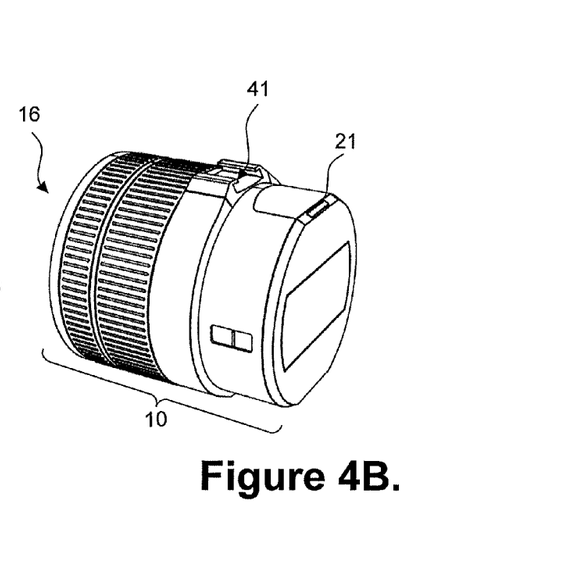

FIGS. 4A and 4B are respectively front and side perspective views showing the digital lens assembly 16 of FIGS. 1A and 1B. Internally, a plurality of lens elements 13 are aligned along an optical axis within a lens barrel 10 with a focal length, possibly variable, to form an image on a plane of a digital image sensor fixedly mounted on the far inside end of the lens barrel 10. Through a combination of appropriate control circuitry and firmware, the digital lens assembly 16 can be configured for different types of imaging purposes, including still photography, video, or a combination of both. Similarly, various onboard lens controls can be provided, including control over automatic or manual focus, zoom, aperture, and shutter speed. For instance, focus or zoom control can be provided through micro servo motor mechanisms integral to the lens barrel 10 to respectively adjust focus of the optical image on the digital image sensor's plane or to adjust the focal length of the lens elements 13. Additionally, aperture control can be provided through a diaphragm integral to the lens barrel 10 and configured to adjust the aperture of the light path. Likewise, shutter speed control can be provided through a shutter integral to the lens barrel 10, either as a leaf shutter or electronic shutter, for instance, that temporally controls light passage onto the digital image sensor. Externally, the digital lens assembly 16 can include other controls and features to facilitate usability and function, such as a hot shoe 41 to mount an external flash unit, a grippable surface 42 around the circumference of the lens barrel 10 to aid with manual focus or zoom, and a latch 43 to allow removal of the digital lens assembly from the modular chassis 15. Still other controls and features are possible.

Internally, the digital lens assembly 16 includes a digital image sensor under the control of a microprocessor and remotely interfaced through a wireless transceiver. The wireless transceiver can be any kind of a wireless device capable of exchanging digital data, such as Wi-Fi, Bluetooth and mobile broadband. The image sensor can be CMOS- or CCD-type image sensor. The digital lens assembly 16 includes an onboard battery, which can be rechargeable, and the various electronic and mechanical components required control the image sensor, capture digital images or video, adjust the lens elements, and wirelessly communicate with the mobile device 12.

The mobile device 12 allows a user to control the operations of the digital lens assembly 16. Exemplary mobile devices 12 include an iPhone, manufactured by Apple, Inc. of Cupertino, Calif.; a Blackberry-brand mobile phone, manufactured by Research In Motion Ltd. of Waterloo, Ontario, Canada; or a mobile phone using the Android operating system, Windows Phone 7 operating system, or Symbian operating system. The mobile device 12 includes a visual display 14, which outputs information to the user. The visual display 14 can be a liquid crystal display (LCD) or another kind of an electronic display. Generally, the visual display 14 will include a touch screen interface operating upon the surface of the visual display 14, which may be a multi-touch interface, and the touch screen interface enables the user to use the visual display 14 for the input of information. Separate user input interfaces, such as keyboards and mice, operate in a visually disjointed yet analogous fashion.

The mobile device 12 has wireless digital data communications capabilities and can form a wireless connection with the wireless transceiver of the digital lens assembly 16, as well as with other external devices and with wide area data networks, such as the Internet. The wireless capabilities of the mobile device 12 are provided through a built-in wireless transceiver that operates with a compatible form of wireless communications. Internally, the mobile device 12 further includes a processor coupled to a memory and configured to execute code implemented as software program modules stored in the memory, including user applications. The memory has sufficient capacity to store the code, as well as at least one digital image. Depending upon the mobile device 12, sufficient memory may be available to store multiple digital images or video data and possibly include removable memory, such as through an SD card.

Operationally, the processor of the mobile device 12 executes at least two applications to interoperate with the digital lens assembly 16. A shutter control application (or module) controls the digital image sensor of the digital lens assembly 16 over the wireless connection. When the user presses the shutter control 17 on the structural frame 11, or an equivalent control as implemented through an application being executed by the mobile device 12, as further described below beginning with reference to FIGS. 5A through 5E, the shutter control application wirelessly commands the digital image sensor of the digital lens assembly 16 to capture the optical image formed on the image sensor's plane and send that captured digital image back to the mobile device 12. A display application (or module) then presents the captured digital image on the visual display 14, which can also include providing user controls to manipulate, edit, store, and post online the captured image.

Figure 5A:
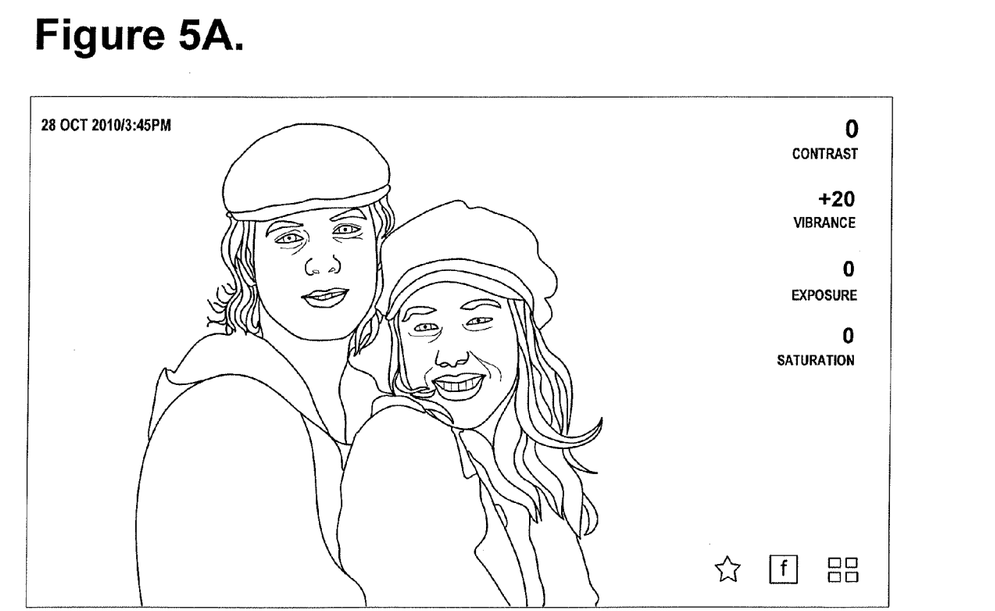
FIGS. 5A through 5E are screen shots showing, by way of example, the user interface generated through application software executing on the mobile device of FIGS. 1A and 1B.

In further embodiments, the mobile device 12 can be configured to provide additional functionality through user applications, which, for instance, the mobile device 12 can download from the Internet using the handheld device's wireless capabilities or from other software application repositories. Through the applications executed by the mobile device 12, the user is able to control various aspects of the digital lens assembly 16, such as by adjusting the shooting parameters of the digital lens assembly 16, setting the values of photographic variables of the image to be captured by the image sensor, and so forth, as well as viewing, manipulating, editing, posting online, storing, sending, and performing other operations on captured digital images. FIGS. 5A through 5E are screen shots showing, by way of example, the user interface generated through application software executing on the mobile device 12 of FIGS. 1A and 1B. Referring first to FIG. 5A, an application displays to the user values of photographic variables of the image, such as contrast, vibrance, exposure, and saturation. These photographic variables may be applicable to an image to be captured, in which case the mobile device 12 wirelessly sends the photographic variables to the digital lens assembly 16 to control the image sensor's operation during image display and capture. The photographic variables may also be applicable in the context of manipulating or editing an already-captured or stored digital image. The term contrast refers to the brightness difference between the darkest and lightest regions of the captured image. The term saturation refers to the intensity of colors in the captured image. The term vibrance refers to increasing the intensity of the duller colors in the captured image while leaving the well-saturated colors of the image unchanged. Finally, the term exposure can refer to both the amount of light that reaches the digital image sensor and to the amount of light present in the captured image, both of which may be adjusted either during image capture or afterwards.

Figure 5B:
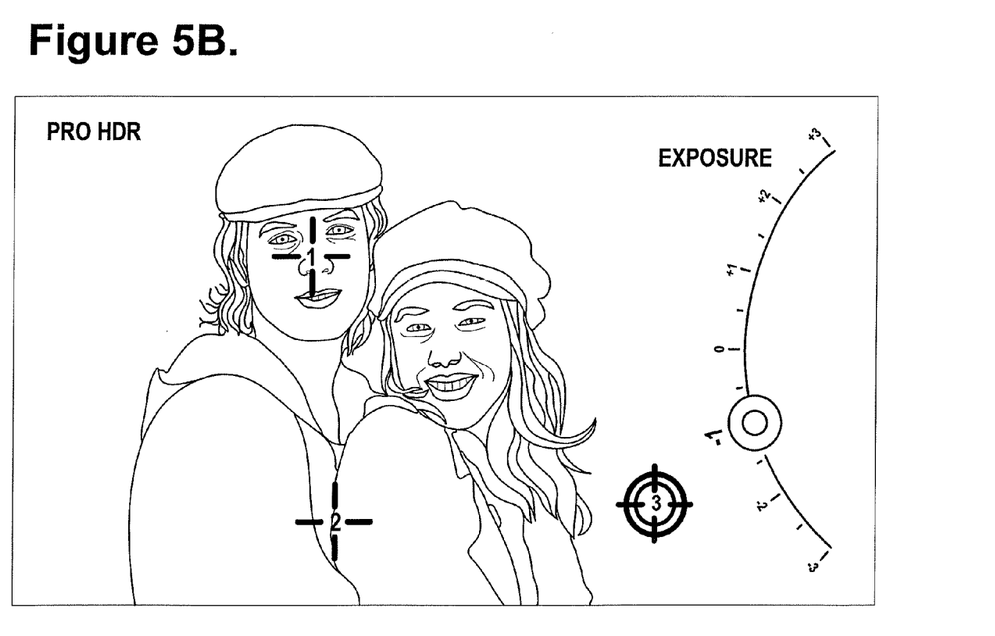
Figure 5C:
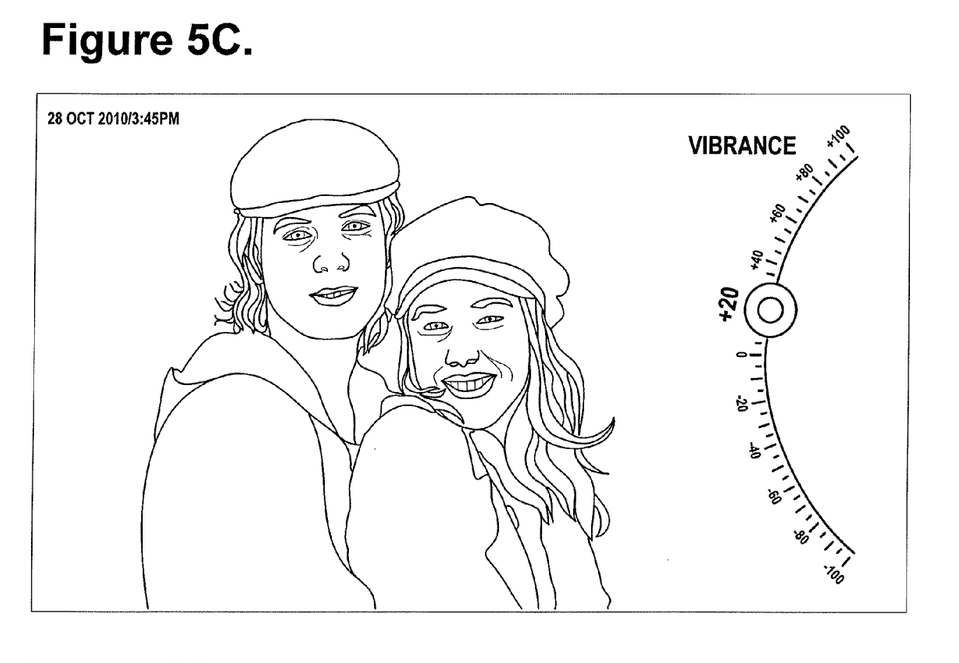
Figure 5D:
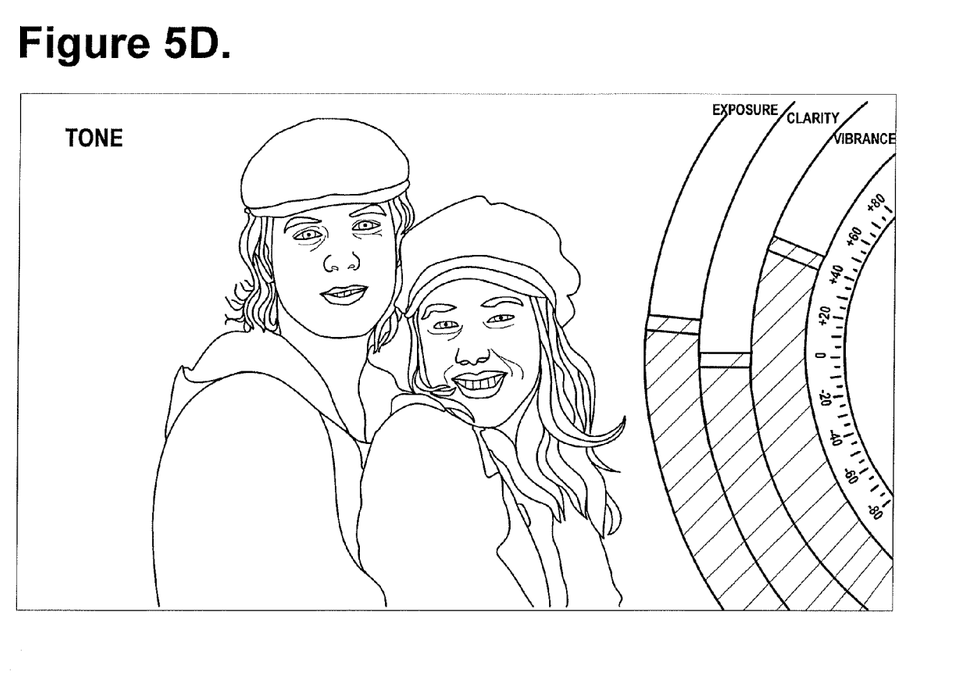

Referring next to FIGS. 5B and 5C, exemplary application tools for respectively implementing control over exposure and vibrance are shown, which may be applicable to controlling how the image sensor displays and captures a digital image or to manipulating or editing an already captured or stored digital image. The tools implement a rotary or radial style of control. The parametric values are displayed in a semi circular arc or pattern on the touch screen display 14 and the user is able to adjust the relative levels of exposure, vibrance or other selectable value by tracing his finger along the semi-circular arc. When the mobile device 12 is secured in the modular chassis 15, this kind of motion can be easily performed by the user's right thumb (or other digit) in a natural form of motion. Referring next to FIG. 5D, an application allows the user to respectively adjust the exposure, clarity and vibrance of the captured image at the same time through a radial control that includes concentric semi-circular controls. The term clarity refers to changing contrast in a particular part of the image, which allows creating greater image depth. Still other arrangements and configurations of radial controls are possible.

Figure 5E:
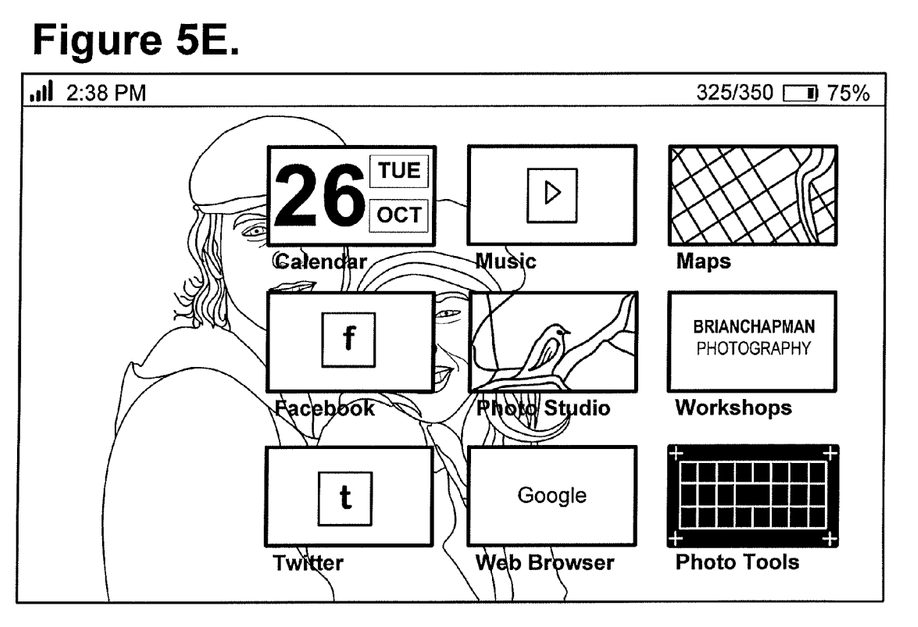

Finally, the mobile device's built-in connectivity can be used to directly post the captured images to other online resources. Referring to FIG. 5E, a set of selectable icons allow the user to launch numerous user applications directly with a single motion, including web-based applications, with some of these applications relating to digital photography.

While the invention has been particularly shown and described as referenced to the embodiments thereof, those skilled in the art will understand that the foregoing and other changes in form and detail may be made therein without departing from the spirit and scope of the invention.

What is claimed is:

1. A handheld modular digital photography system, comprising:
  a lens assembly comprising a plurality of lens elements aligned on an optical axis to form an optical image on a plane of a digital image sensor, both the lens elements and image sensor fixedly mounted within a lens barrel, the image sensor electrically-interfaced to a controller with a wireless transceiver, the lens barrel provided with a mechanical lens coupling on an outer proximal end; and
  a modular chassis, comprising:
    a structural frame comprising a cradle shaped to securely hold a handheld mobile device and an electrical coupler provided on an interior surface of the cradle into which the mobile device can be electronically interfaced;
    a lens mount on an outer surface of the modular chassis opposite the cradle disposed to receive and securely couple the lens coupling; and
    a shutter control provided on the structural frame and configured to electrically signal the mobile device via the electrical coupler, the mobile device wirelessly sending the signal to the controller through the wireless transceiver, which triggers capture of the optical image by the image sensor and wireless relay of the captured image through the wireless transceiver back to the mobile device.

2. A system according to claim 1, further comprising:
  an ergonomic grip formed into the structural frame upon which the shutter control is mounted.

3. A system according to claim 1, further comprising:
  at least one further control provided on the structural frame selected from the group comprising an aperture selection, shutter speed, exposure compensation, programmed mode, manual mode, and special functions.

4. A system according to claim 1, further comprising at least one of:
  an auxiliary battery housed in the structural frame and configured to provide electrical power to the mobile device; and
  a removable memory interface integral to the structural frame and configured to store the optical image captured by the image sensor.

5. A system according to claim 1, further comprising:
  a camera control module executed as software by the mobile device and configured to display, store, and manipulate the optical image captured by the image sensor.

6. A system according to claim 1, further comprising:
  an autofocus mechanism integral to the lens barrel and configured to adjust the lens elements along the optical axis and bring the optical image into focus on the plane.

7. A system according to claim 1, further comprising:
  a zoom mechanism integral to the lens barrel and configured to adjust a focal length of the lens elements along the optical axis.

8. A system according to claim 1, further comprising:
  a diaphragm integral to the lens barrel and configured to adjust an aperture of the lens elements along the optical axis.

9. A system according to claim 1, further comprising:
  a shutter integral to the lens barrel and configured to temporally control light passage on to the image sensor.

10. A handheld modular photography system, comprising:
  an interchangeable lens comprising a plurality of lens elements aligned on a common optical axis, the lens elements fixedly mounted within a lens barrel, the lens barrel provided with a lens coupling about an outer proximal end;
  a lens adapter comprising a digital image sensor electrically-interfaced to a controller with a wireless transceiver, an adapter housing that defines a circular bore with the image sensor fixedly mounted at on the bottom surface of the circular bore, the adapter housing further comprises a lens mount on an outer distal end and an adapter coupling on an outer proximal end, the lens mount disposed to receive and securely couple the lens coupling and maintain the common optical axis to form an optical image on a plane of the image sensor; and
  a modular chassis, comprising:
    a structural frame comprising a cradle shaped to securely hold a handheld mobile device and an electrical coupler provided on an interior surface of the cradle into which the mobile device can be electronically interfaced;
    an adapter mount on an outer surface of the modular chassis opposite the cradle disposed to receive and securely couple the adapter coupling; and
    a shutter control provided on the structural frame and configured to electrically signal the mobile device via the electrical coupler, the mobile device wirelessly sending the signal to the controller through the wireless transceiver, which triggers capture of the optical image by the image sensor and wireless relay of the captured image through the wireless transceiver back to the mobile device.

11. A system according to claim 10, further comprising:
an ergonomic grip formed into the structural frame upon which the shutter control is mounted.

12. A system according to claim 10, further comprising:
at least one further control provided on the structural frame selected from the group comprising an aperture selection, shutter speed, exposure compensation, programmed mode, manual mode, and special functions.

13. A system according to claim 10, further comprising at least one of:
an auxiliary battery housed in the structural frame and configured to provide electrical power to the mobile device; and
a removable memory interface integral to the structural frame and configured to store the optical image captured by the image sensor.

14. A system according to claim 10, further comprising:
a camera control module executed as software by the mobile device and configured to display, store, and manipulate the optical image captured by the image sensor.

15. A system according to claim 10, further comprising:
an autofocus mechanism integral to the lens barrel and configured to adjust the lens elements along the optical axis and bring the optical image into focus on the plane.

16. A system according to claim 10, further comprising:
a zoom mechanism integral to the lens barrel and configured to adjust a focal length of the lens elements along the optical axis.

17. A system according to claim 10, further comprising:
a diaphragm integral to the lens barrel and configured to adjust an aperture of the lens elements along the optical axis.

18. A system according to claim 10, further comprising:
a shutter integral to at least one of the lens barrel and the adapter housing and configured to temporally control light passage on to the image sensor.

19. A handheld modular photography system, comprising:
a lens assembly comprising a plurality of lens elements aligned on an optical axis to form an optical image on a plane of a digital image sensor, both the lens elements and image sensor fixedly mounted within a lens barrel, the image sensor electrically-interfaced to a controller with a wireless transceiver, the lens barrel provided with a mechanical lens coupling on an outer proximal end;
a modular chassis, comprising:
   a structural frame comprising a cradle shaped to securely hold a handheld mobile device equipped with a visual display and an electrical coupler provided on an interior surface of the cradle into which the mobile device can be electronically interfaced;
   a lens mount on an outer surface of the modular chassis opposite the cradle disposed to receive and securely couple the lens coupling; and
   a shutter control provided on the structural frame and configured to electrically signal the mobile device via the electrical coupler, the mobile device wirelessly sending the signal to the controller through the wireless transceiver, which triggers capture of the optical image by the image sensor and wireless relay of the captured image through the wireless transceiver back to the mobile device; and
software modules electronically stored in a computer-readable storage in the mobile device as code configured to be executed by a processor of the mobile device, comprising:
   a shutter control module configured to cause the mobile device to wirelessly command the digital image sensor of the digital lens assembly to capture the image formed on the image sensor's plane and wirelessly send that captured image back to the mobile device; and
   a display module configured to cause the mobile device to present the captured image on the display upon receipt from the wireless transceiver.

20. A system according to claim 19, wherein the mobile device further comprises a touch screen interface operating upon the display's surface, further comprising:
a rotary control generated by the touch screen interface with a visual range of parametric values output in a semi circular pattern and selectable by rotary motion of a user's digit upon the touch screen interface.

21. A system according to claim 20, wherein the variable is selected from the group comprising contrast, vibrance, exposure, clarity, and saturation.

* * * * *